United States Patent
Tian et al.

(10) Patent No.: US 9,019,101 B2
(45) Date of Patent: Apr. 28, 2015

(54) POSITION LOCATION SYSTEM ARCHITECTURE: MESSAGING AND RANGING LINKS

(71) Applicant: QUALCOMM Incorporated, San Diego, CA (US)

(72) Inventors: Bin Tian, San Diego, CA (US); Ahmad Jalali, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 13/692,947

(22) Filed: Dec. 3, 2012

(65) Prior Publication Data

US 2014/0152437 A1    Jun. 5, 2014

(51) Int. Cl.
| | |
|---|---|
| G08B 1/08 | (2006.01) |
| H04W 4/04 | (2009.01) |
| G08C 17/02 | (2006.01) |
| G01S 5/02 | (2010.01) |
| H04W 64/00 | (2009.01) |

(52) U.S. Cl.
CPC ............... H04W 4/04 (2013.01); G08C 17/02 (2013.01); G01S 5/02 (2013.01); H04W 64/00 (2013.01); G01S 5/0289 (2013.01)

(58) Field of Classification Search
CPC ...... H04W 4/04; H04W 64/00; G01S 5/0289; G01S 5/02; G08C 17/02
USPC ............... 340/539.14, 539.1, 539.15, 539.16, 340/539.17, 539.19, 539.21, 539.23, 500; 370/350, 477; 367/127; 375/130, 259, 375/219
See application file for complete search history.

(56) References Cited

U.S. PATENT DOCUMENTS

| | | | |
|---|---|---|---|
| 8,599,758 B1 * | 12/2013 | Ogale et al. | 370/328 |
| 2003/0013146 A1 * | 1/2003 | Werb | 435/9 |
| 2009/0207694 A1 | 8/2009 | Guigne et al. | |
| 2009/0238210 A1 * | 9/2009 | Myers et al. | 370/477 |
| 2009/0303067 A1 | 12/2009 | Sharp | |
| 2010/0109842 A1 | 5/2010 | Patel et al. | |

(Continued)

FOREIGN PATENT DOCUMENTS

| | | |
|---|---|---|
| EP | 1480386 A2 | 11/2004 |
| WO | WO 0046771 A1 * | 8/2000 |

(Continued)

OTHER PUBLICATIONS

Pahlavan, et al., "Indoor Geolocation Science and Technology", IEEE Communications Magazine, vol. 40, No. 2, pp. 112-118, Feb. 2002.
International Search Report and Written Opinion—PCT/US2013/071472—ISA/EPO—May 28, 2014.

*Primary Examiner* — Anh V La
(74) *Attorney, Agent, or Firm* — Jeffrey D. Jacobs

(57) ABSTRACT

An indoor position location system. The indoor position location system may include a narrowband messaging link. The narrowband messaging link may enable synchronization and ranging initialization between asset tags and access points of the indoor position location system. The indoor position location system may also include a wideband ranging link. The wideband ranging link may enable a ranging operation between the asset tags, the access points and a position location server of the indoor position location system. The position location server may determine a location of at least one of the asset tags according to the ranging operation.

19 Claims, 8 Drawing Sheets

(56) References Cited

U.S. PATENT DOCUMENTS

| | | |
|---|---|---|
| 2010/0112950 A1 | 5/2010 | Haartsen et al. |
| 2010/0215478 A1 | 8/2010 | Oda et al. |
| 2011/0111751 A1 | 5/2011 | Markhovsky et al. |
| 2011/0169607 A1 | 7/2011 | Paulson |
| 2012/0002702 A1* | 1/2012 | Lakkis et al. ............... 375/130 |
| 2012/0044786 A1* | 2/2012 | Booij et al. ............... 367/127 |
| 2014/0329536 A1 | 11/2014 | Tian et al. |
| 2014/0368334 A1 | 12/2014 | Tian et al. |

FOREIGN PATENT DOCUMENTS

| | | |
|---|---|---|
| WO | 0110154 A1 | 2/2001 |
| WO | 02088776 A2 | 11/2002 |
| WO | 2007076301 A2 | 7/2007 |
| WO | 2011149497 A1 | 12/2011 |
| WO | 2011153291 A2 | 12/2011 |

* cited by examiner

POSITION LOCATION SYSTEM ARCHITECTURE: MESSAGING AND RANGING LINKS

FIELD

Aspects of the present disclosure relate generally to wireless communication systems, and more particularly to an indoor position location architecture.

BACKGROUND

Wireless networks are widely deployed to provide various communication services such as voice, video, packet data, messaging, broadcasting and other like wireless communication services. These wireless networks may be multiple-access networks capable of supporting multiple users by sharing the available network resources. In a wireless local area network (WLAN), an access point supports communication for a number of wireless stations within the wireless network. In an ad-hoc mode, the wireless stations ("peer nodes") communicate in a peer-to-peer (P2P) manner without an access point. Similarly, a peer-to-peer network allows the peer nodes to directly communicate with one another. In a peer-to-peer network, peer-to-peer nodes within range of one another discover and communicate directly without an access point.

An indoor positioning system (IPS) may refer to a network of devices used to wirelessly locate objects or people inside a building. Instead of using global positioning satellites (GPS), an IPS may rely on nearby nodes that actively locate tags.

SUMMARY

In one aspect of the disclosure, an indoor position location system is described. The indoor position location system may include a narrowband messaging link. The narrowband messaging link may enable synchronization and ranging initialization between asset tags and access points of the indoor position location system. The indoor position location system may also include a wideband ranging link. The wideband ranging link may enable a ranging operation between the asset tags, the access points and a position location server of the indoor position location system. The position location server may determine a location of at least one of the asset tags according to the ranging operation.

In another aspect of the disclosure, a method within an indoor position location system is described. The method includes periodically waking-up, by an asset tag, to search for a narrowband pilot signal. The method also includes synchronizing, by the asset tag, with an access point when the narrowband pilot signal is detected.

According to one aspect of the present disclosure, an apparatus for an indoor position location system is described. The apparatus includes a memory and a processor(s) coupled to the memory. The processor(s) is configured to periodically wake-up to search for a narrowband pilot signal. The processor(s) is further configured to synchronize with an access point when the narrowband pilot signal is detected.

According to one aspect of the present disclosure, a computer program product for an indoor position location system is described. The computer program product includes a computer readable medium having non-transitory program code recorded thereon. The program code includes program code to periodically wake-up to search for a narrowband pilot signal. The program code also includes program code to synchronize with an access point when the narrowband pilot signal is detected.

According to another aspect of the present disclosure, an apparatus of an indoor position location system is described. The apparatus includes means for periodically waking-up to search for a narrowband pilot signal. The apparatus also includes means for synchronizing with an access point when the narrowband pilot signal is detected.

In another aspect of the disclosure, a method within an indoor position location system is described. The method includes transmitting, by an asset tag, a reduced size packet to an access point. The method also includes receiving a frequency and/or timing error estimate of the asset tag relative to the access point. The method further includes synchronizing, by the asset tag, with the access point according to the frequency and/or timing error estimate of the asset tag relative to the access point.

According to one aspect of the present disclosure, an apparatus for an indoor position location system is described. The apparatus includes a memory and a processor(s) coupled to the memory. The processor(s) may transmit a reduced size packet to an access point. The processor(s) may also receive a frequency and/or timing error estimate of the apparatus relative to the access point. The processor(s) may also synchronize with the access point according to the frequency and/or timing error estimate of the apparatus relative to the access point.

According to one aspect of the present disclosure, a computer program product for an indoor position location system is described. The computer program product includes a computer readable medium having non-transitory program code recorded thereon. The program code includes program code to transmit a reduced size packet to an access point. The program code also includes program code to receive a frequency and/or timing error estimate relative to the access point. The program code further includes program code to synchronize with the access point according to the frequency and/or timing error estimate relative to the access point.

According to another aspect of the present disclosure, an apparatus of an indoor position location system is described. The apparatus includes means for transmitting a reduced size packet to an access point. The apparatus also includes means for receiving a frequency and/or timing error estimate of the apparatus relative to the access point. The apparatus further includes means for synchronizing with the access point according to the frequency and/or timing error estimate of the apparatus relative to the access point.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

In one aspect of the disclosure, an indoor position location system tracks the location of assets (e.g., users) using a device that that may be worn by an asset, referred to herein as an "asset tag." The asset tag may be configured to support wireless node functionality (e.g., a wireless station and/or a wireless node of a peer-to-peer network), or other like radio access technology. It should be recognized that asset tag operation to enable the indoor position location system may be incorporated into a wireless handheld device of a user. Although the asset tags may be specified as stations, aspects of the disclosure also relate to ad-hoc and/or peer-to-peer network implementations in which wireless peer nodes and/or wireless stations discover and communicate directly without access points. A wireless station can be a dedicated access point or a temporary access point (e.g., a soft access point) configured for access point functionality, for example, when operating according to a wireless local area network (WLAN) infrastructure mode. In a WLAN ad-hoc mode, or peer-to-peer network, the wireless stations/peer nodes discover and communicate directly without an access point.

In one aspect of the disclosure, the asset tags transmit known preambles that are received by multiple access points (APs). The APs may estimate and send a time of arrival (TOA) of the preamble from a specific asset tag to a position location server. The position location server processes received TOAs from the multiple APs to estimate the position of the asset tags. In another configuration, the APs transmit a known pilot signal that is received by all asset tags in the respective coverage area of the APs. In this configuration, the asset tags make TOA measurements based on the received pilot signals from different APs. The asset tags may compute their position based on the TOA measurements or send the TOA measurements to a position location server (PLS) for position location computation. The indoor position location system may be implemented in various wireless networks such as the WLAN configuration shown in FIG. 1.

Figure 1:
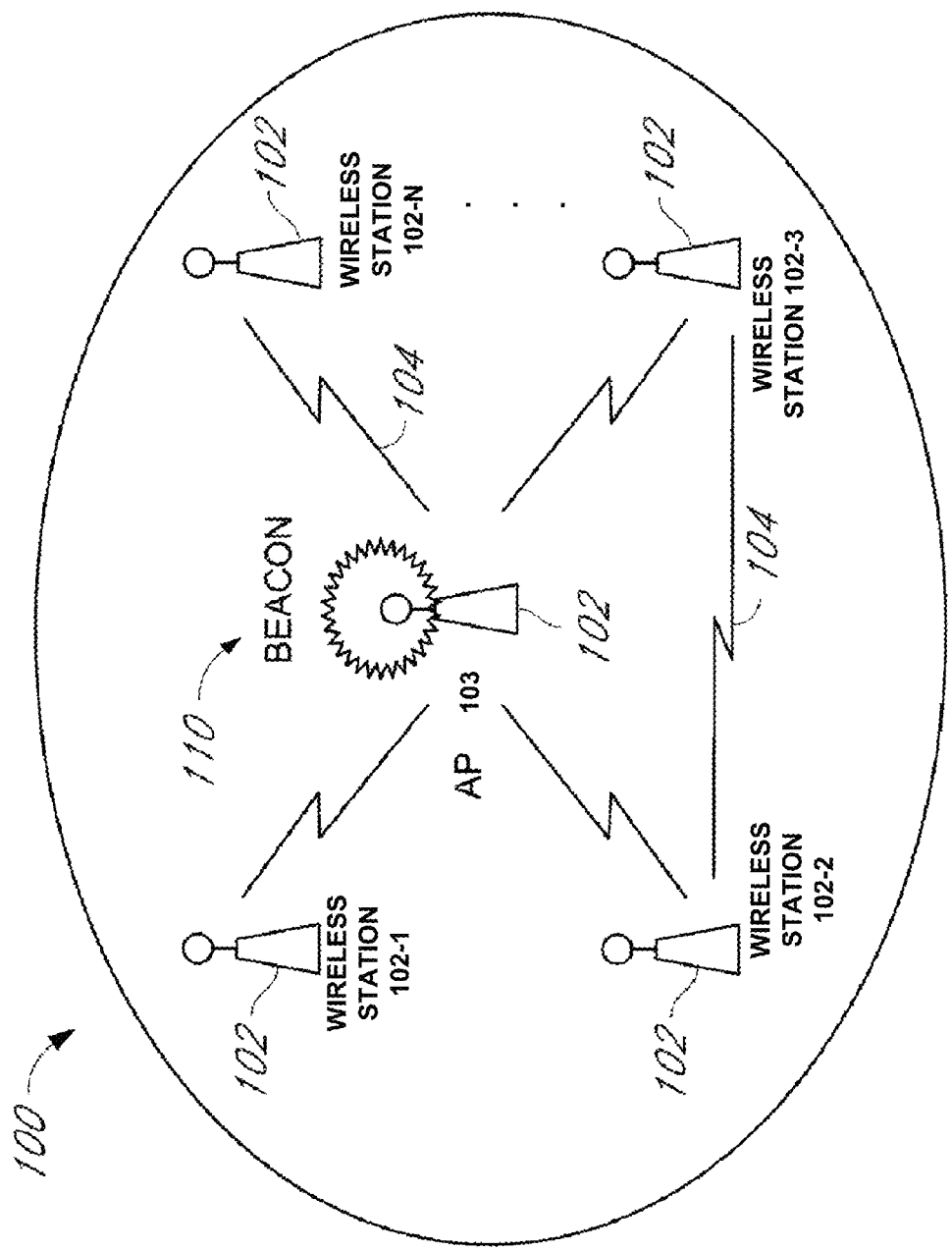
FIG. 1 illustrates a block diagram of a communication system according to one aspect of the disclosure.

One example of a wireless communication system 100 is illustrated in FIG. 1 according to an infrastructure mode. The wireless communication system 100 may include a number of wireless stations 102 and access points 103 that can communicate with one another over wireless links 104. Although the wireless communication system 100 is illustrated with five wireless stations/access points 102/103, it should be appreciated that any number of stations and access points (wired or wireless) may form the wireless communication system 100. In the illustration, the access points 103 are dedicated access points. Alternatively, the access points 103 may be configured for access point functionality (e.g., as a soft access point).

The wireless stations/access points 102/103 may be any device configured to send and receive wireless communications, such as a laptop computer, Smartphone, a printer, a personal digital assistant, a camera, a cordless telephone, a session initiation protocol phone, a handheld device having wireless connection capability, a user equipment, an access terminal, or any other suitable device. In one aspect of the disclosure, the wireless stations/access points 102/103 are incorporated into a tag that is placed on an asset (e.g., a user). In the wireless communication system 100, the wireless stations/access points 102/103 may be distributed throughout a geographic region. Further, each wireless station/access point 102/103 may have a different coverage region over which it may communicate. The access points 103 may include or be implemented as a base station, a base transceiver station, a terminal, a wireless node operating as an access point, or the like. The wireless stations/access points 102/103 in the wireless communication system 100 may communicate wirelessly using any suitable wireless network standard.

In one configuration, an asset tag may be configured as one of the wireless stations 102 that associates with one of the access points 103 to send and/or receive position information from one of the access points 103 according to an initial wireless access message 110 broadcast by one of the access points 103. In one aspect of the disclosure, the asset tags measure pilot signals from access points 103 and compute an asset tag position. Alternatively, the asset tags transmit the pilot measurements to a position location server. In another configuration, the asset tags transmit known preambles that are received by the access points 103. The access points 103 may estimate and send the time of arrival (TOA) of the preamble from a specific tag to the position location server that estimates the position of the asset tags. Position location computations may be carried out at the PLS using the TOAs received from the different access points 103, for example, as shown in FIG. 4.

Figure 2:
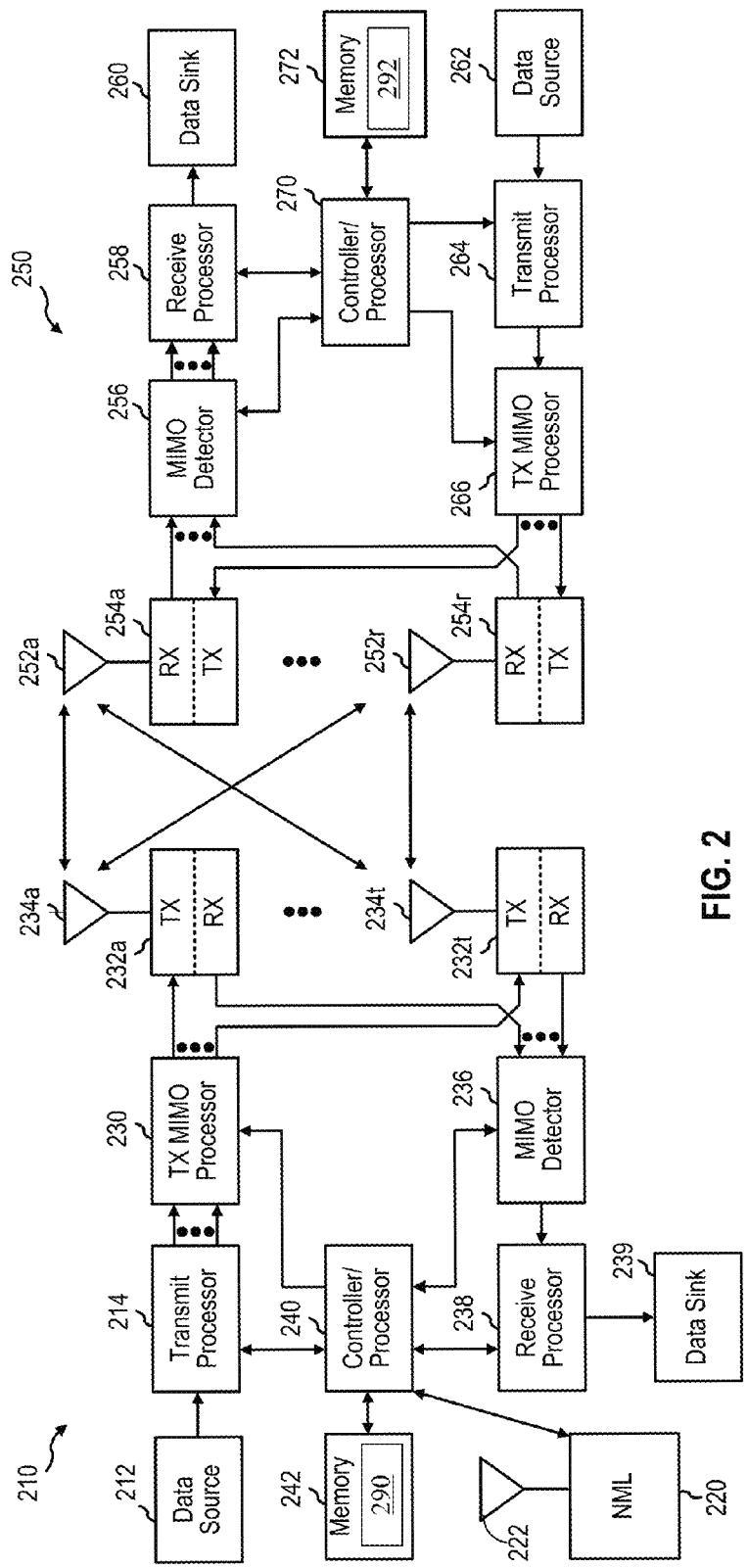
FIG. 2 illustrates an exemplary hardware configuration of wireless nodes used in the communication system, such as the position location system illustrated in FIG. 4.
Figure 3:
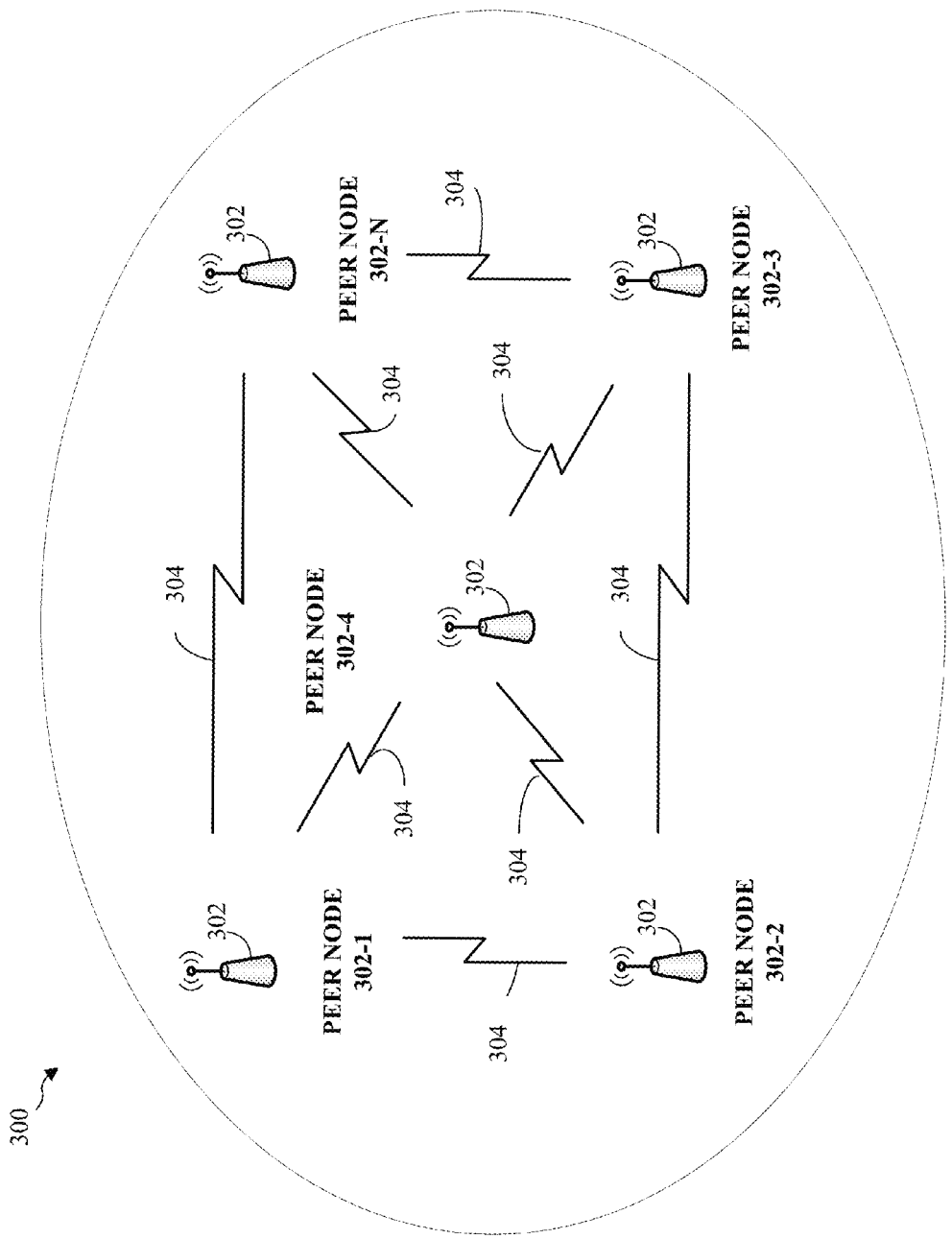
FIG. 3 illustrates a block diagram of a peer-to-peer network according to one aspect of the disclosure.
Figure 4:
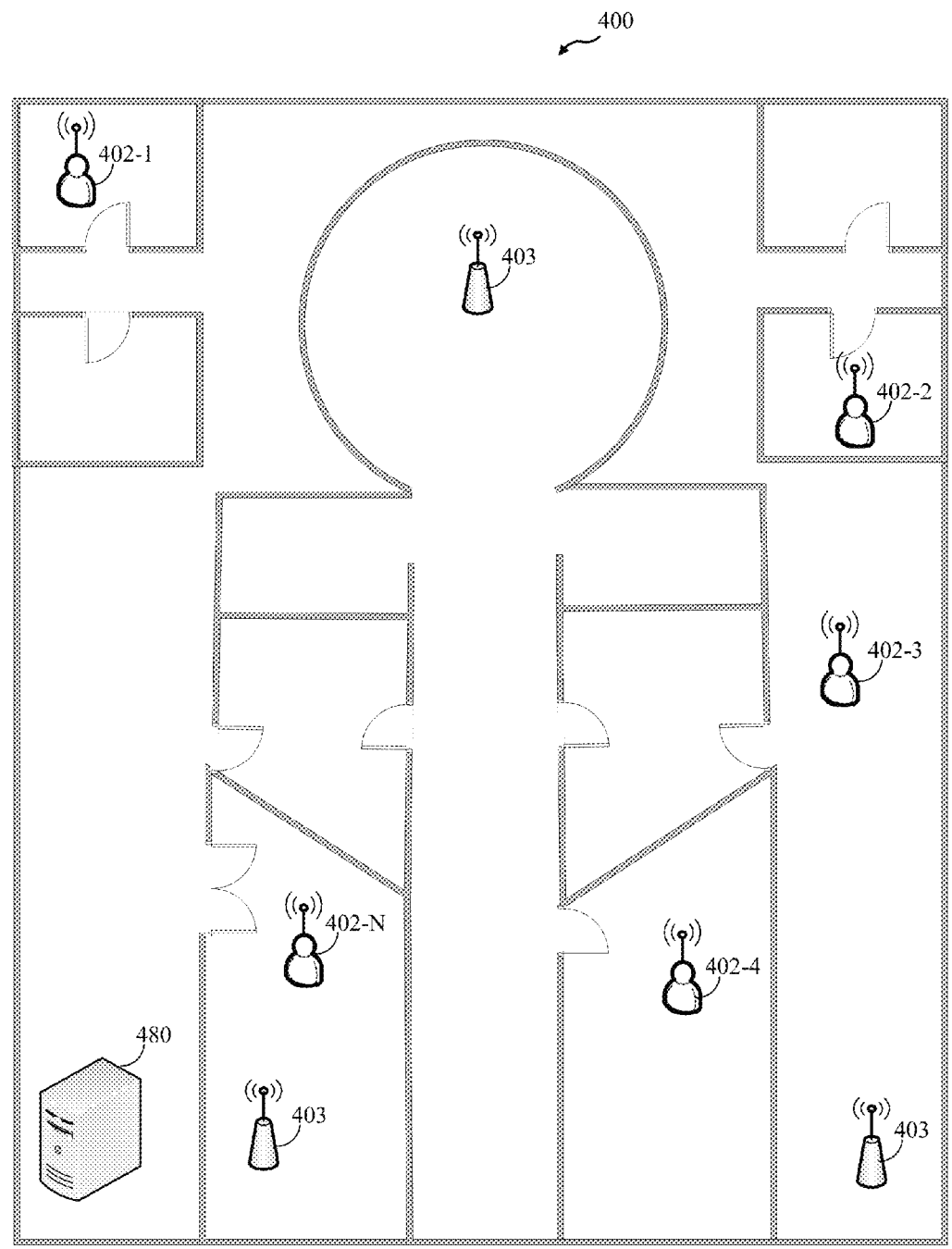
FIG. 4 is a block diagram illustrating a position location system according to one aspect of the disclosure.

FIG. 2 shows a block diagram of a design of an access point 210 and a wireless station 250, each of which may be one of the wireless nodes in FIGS. 1, 3, and 4. Each of the wireless nodes in the wireless communication system 100 may include a wireless transceiver to support wireless communication and controller functionality to manage communication over the network. The controller functionality may be implemented within one or more digital processing devices. The wireless transceiver may be coupled to one or more antennas to facilitate the transmission and reception of signals over a wireless channel.

In one configuration, the access point 210 may be equipped with antennas 234 (234a, . . . , 234t), and the wireless station 250 may be equipped with antennas 252 (252a, . . . , 252r).

At the access point 210, a transmit processor 214 may receive data from a data source 212 and control information from a controller/processor 240. The transmit processor 214 may process (e.g., encode and symbol map) the data and control information to obtain data symbols and control symbols, respectively. The transmit processor 214 may also generate reference symbols, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the transceivers 232 (232a, . . . , 232t). Each of the transceivers 232 may process a respective output symbol stream to obtain an output sample stream. Each of the transceivers 232 may further process (e.g., convert to analog, amplify, filter, and upconvert) the output sample stream to obtain a transmission signal. Signals from transceivers 232 may be transmitted via the antennas 234 (234a, . . . , 234t), respectively.

At the wireless station 250, the antennas 252 (252a, . . . , 252r) may receive the signals from the access point 210 and may provide received signals to the transceivers 254 (254a, . . . , 254r), respectively. Each of the transceivers 254 may condition (e.g., filter, amplify, downconvert, and digitize) a respective received signal to obtain input samples. Each of the transceivers 254 may further process the input samples to obtain received symbols. A MIMO detector 256 may obtain received symbols from all of the transceivers 254, perform MIMO detection on the received symbols if applicable, and provide detected symbols. A receive processor 258 may process (e.g., demodulate, deinterleave, and decode) the detected symbols, provide decoded data for the wireless station 250 to a data sink 260, and provide decoded control information to a controller/processor 270.

When transmitting, from the wireless station 250, a transmit processor 264 may receive and process data from a data source 262 and control information from the controller/processor 270. The transmit processor 264 may also generate reference symbols for a reference signal. The symbols from the transmit processor 264 may be precoded by a TX MIMO processor 266 if applicable, further processed by the transceivers 254, and transmitted to the access point 210. At the access point 210, the signals received from the wireless station 250 may be received by the antennas 234, processed by the transceivers 232, detected by a MIMO detector 236 if applicable, and further processed by a receive processor 238 to obtain decoded data and control information sent by the wireless station 250. The receive processor 238 may provide the decoded data to a data sink 239 and the decoded control information to the controller/processor 240. The access point 210 can send messages to other base stations, for example, over a backhaul link. In one configuration, the access point includes a narrowband messaging link (NML) 220 having an antenna 222 for enabling synchronization and ranging initialization between asset tags and access points of an indoor position location system, for example, as shown in FIG. 4. It should be recognized that the wireless station 250 may also be configured to include a narrowband message link, such as the NML 220 of the access point 210.

The controller/processor 240 may direct the operation at the access point 210 and the controller/processor 270 may direct the operation at wireless station 250, respectively. The controller/processor 270 and/or other processors and modules at the wireless station 250 may perform or direct the execution of the functional blocks illustrated in method flow charts of FIGS. 5 and 7, and/or other processes for the techniques described herein. The memory 242 may store data and program codes for the access point 210 and the memory 272 may store data and program codes for the wireless station 250. For example, the memory 272 of the wireless station 250 may store a position location module 292 which, when executed by the controller/processor 270, configures the wireless station 250 for operation within an indoor position location system, for example, as shown in FIG. 4. Similarly, the memory 242 of the access point 210 may store a position location module 290 which, when executed by the controller/processor 240, configures the access point 210 for operation within the indoor position location system shown in FIG. 4.

FIG. 3 illustrates a block diagram of a peer-to-peer network 300 according to one aspect of the disclosure. In some aspects, a peer-to-peer network 300 may be established between two or more peer nodes 302 (302-1, 302-2, 302-3, 302-4, . . . 302-N). The peer nodes 302 in the peer-to-peer network 300 may communicate wirelessly using any suitable wireless network standard. The peer-to-peer network 300 may include a number of peer nodes 302 that can communicate with one another over wireless links 304. An asset tag may be configured according to the wireless station 250 of FIG. 2, and operate as one of the peer nodes 302 of the peer-to-peer network 300.

For example, an asset tag that operates as one of the peer nodes 302-1 may associate with another of the peer nodes 302-4 to transmit known preambles that are received by the peer nodes 302. One of the peer nodes 302-1 may estimate and send the time of arrival (TOA) of the preamble from a specific asset tag to a position location server (not shown) that estimates the position of the asset tags. Position location computations may be carried out at the position location server using the TOAs received from the different peer nodes 302. In another configuration, the peer nodes 302 transmit a known pilot signal, which is received by all asset tags in the respective coverage area of the peer nodes. In this configuration, the asset tags make TOA measurements on the received pilots from different peer nodes 302 and either compute the position at the asset tag or send the measurements to the position location server for position location computation.

An asset tag may be any device configured to send and receive wireless communications, such as a laptop computer, a smartphone, a printer, a personal digital assistant, a camera, a cordless telephone, a session initiation protocol phone, a handheld device having wireless connection capability, a user equipment, an access terminal, or any other suitable device that may be worn as an asset tag.

FIG. 4 is a block diagram illustrating an indoor position location system 400 according to one aspect of the disclosure. The indoor position location system 400 may track assets (e.g., people) using asset tags 402 (402-1, . . . , 402-N) that people wear. The asset tags 402 may be configured according the wireless station 250 of FIG. 2 to support wireless node functionality (e.g., a wireless stations and/or a wireless nodes of a peer-to-peer network), or other like radio access technology.

As shown in FIG. 4, the indoor position location system 400 includes the asset tags 402, access points (APs) 403 installed on the premises, and a position location server (PLS) 480 that estimates the position of the asset tags 402. In one configuration, the asset tags 402 transmit known preambles that are received by the APs 403. The APs 403 may estimate and send the time of arrival (TOA) of the preamble from a specific asset tag to the position location server 480. Position location computations may be carried out at the position location server 480 using the TOAs received from the different APs 403. This approach may help reduce the power consumption at the asset tags 402. In another configuration, the APs 403 transmit a known pilot signal, which is received by all asset tags 402 in the respective coverage area of the APs 403. In this configuration, the asset tags 402 make TOA measurements based on the received pilots from different APs 403. The asset tags 402 may either compute the position at one of the asset tags 402 or send the measurements to the position location server 480 for position location computation. In the configuration where the asset tags 402 measure the pilot signals from APs 403 and compute their respective position without the position location server 480, higher power consumption at the asset tags 402 may lower battery life.

The indoor position location system 400 recognizes that the two basic functions of a tracking system, messaging and positioning, have different specifications. For messaging, one of the asset tags 402-1 communicates with one of the APs 403 (e.g., closest to the asset tag), in which a small amount of data is exchanged. As a result, bandwidth is not a primary concern in the messaging portion of the indoor position location system 400. For positioning, ranging measurements may be made between asset tags 402 and multiple APs 403. As a result, the ranging operation may involve a longer access distance. Moreover, a wide bandwidth for a ranging signal is specified to achieve accurate range measurements. In one configuration, the indoor position location system 400 provides the messaging and synchronization portion of the air interface of the system architecture on a first air interface (messaging link) and the ranging portion of the system architecture on a second air interface (ranging link). For example, the position location server 480 may be configured as shown in FIG. 2, in which one of the antennas 234 provides a ranging link and a narrowband messaging link (NML) 220 provides a messaging link.

In one configuration, a narrowband messaging link (e.g., NML 220 of FIG. 2) is for a messaging and synchronization to enable a subsequent ranging measurement. The NML 220 may be used by the asset tags 402 to communicate with APs 403 installed on the premises, as well as to provide coarse synchronization between the APs 403 and also between the APs 403 and the asset tags 402. In one configuration, the asset tags 402 wakeup periodically and search for pilot signals transmitted by APs 403 on a relatively narrowband signal, such as one MHz of bandwidth using, for example the NML 220, versus many tens or hundreds of MHz of bandwidth for a ranging link. The asset tags 402 detect the pilot signal and synchronize with one of the APs 403 within the coarse time of the narrowband signal. In another configuration, the asset tags 402, after waking up from sleep mode, send a reduced size packet to the APs 403 that the APs 403 use to measure a time and frequency error of the asset tags 402 with respect to the APs 403.

In this configuration, the APs 403 sends the measurement results and other ranging related scheduling information back to the asset tags 402 after a predetermined delay. The asset tags 402 use the frequency and timing errors reported by the APs 403 to pre-correct their frequency and timing offset prior to sending a preamble to the APs 403. Pre-correcting at the asset tags 402 reduces an amount of time for performing a frequency and timing search at the APs 403. Once the coarse time synchronization is achieved, a ranging operation begins by exchanging preambles between the asset tags 402 and the APs 403. The coarse time synchronization allows a reduced search window in the ranging link. The asset tags 402 may also communicate with other asset tags in a peer-to-peer mode and measure a range between themselves on the ranging link (e.g., one the antennas 252 of FIG. 2). The coarse synchronization between the asset tags 402 obtained from the narrowband messaging link (e.g., NML 220 of FIG. 2) helps the asset tags 402 reduce their search window when estimating a range in the peer-to-peer mode on a wideband ranging link (e.g., one of the antennas 252).

In this configuration, the wideband ranging link enables a ranging operation between the asset tags 402, the APs 403, and the position location server 480 of the indoor position location system 400. In this configuration, the position location server 480 determines a location of at least one of the asset tags 402 according to the ranging operation. The wideband ranging link may be scheduled through the narrowband messaging link. In one configuration, the asset tags 402 specified for a ranging operation are know when the wideband ranging preamble is transmitted and what pseudo noise (PN) sequence is used based on scheduling information received through the narrowband messaging link. In this configuration, amount of time in which the asset tags 402 are active may be reduced by using the scheduling information received through the narrowband messaging link.

In one configuration, a duration of the preamble that the asset tags 402 transmit is limited to reduce power consumption at the asset tags 402.

One preamble design used in existing systems, such as the CDMA2000 family of protocols, includes a known preamble that is used on a given access channel between the asset tags 402 and the APs 403. There are multiple access channels, and different asset tags 402 are assigned to different access channels, with asset tags 402 assigned to each access channel. Devices that simultaneously transmit a preamble through the narrowband link may be assigned a different pseudo-random sequence or the same pseudo-random sequence with a different offset. The preamble signal consists of this known sequence to provide an asset tag identification (ID). To avoid different asset tags 402 from sending their preambles at the same time, the preamble transmission times of different asset tags 402 may be separated in time based on IDs of the asset tags 402 and/or hashing algorithms known to the asset tags 402 and to the APs 403.

Figure 5:
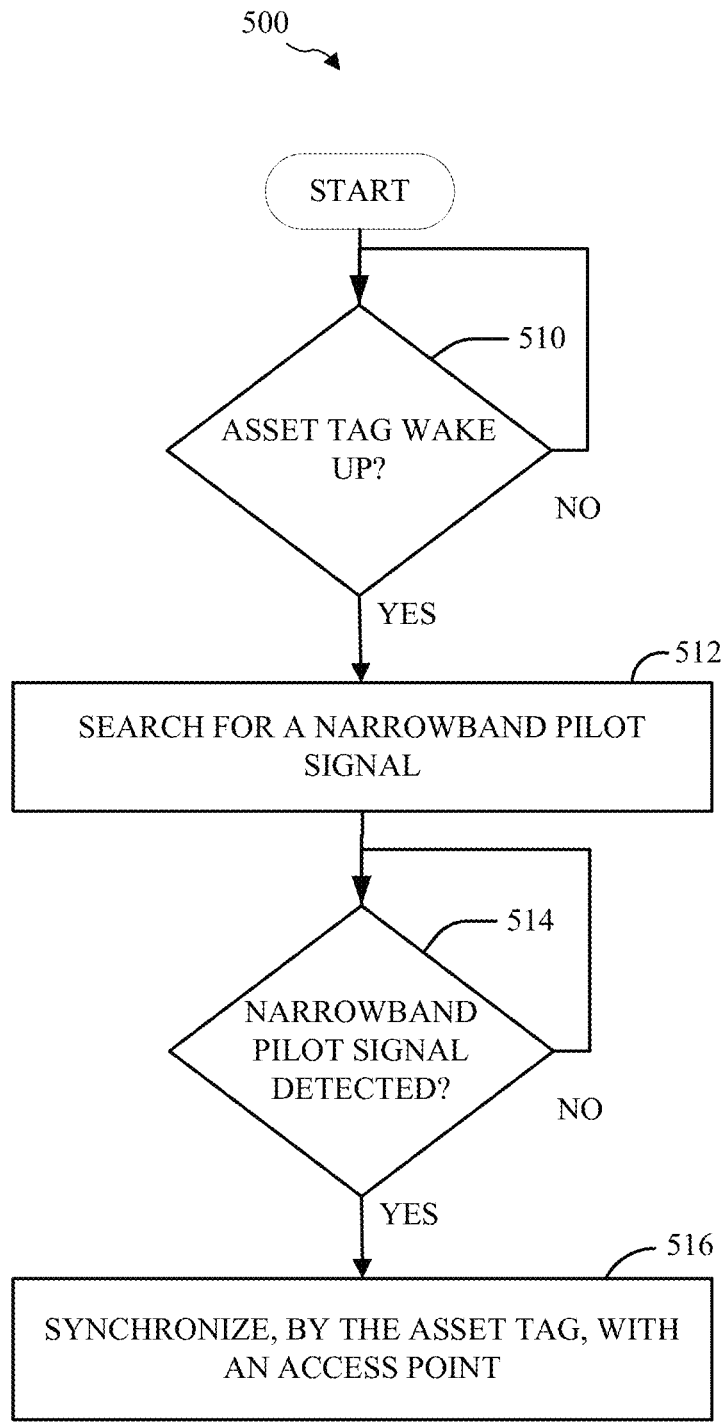
FIG. 5 is a block diagram illustrating a position location method implemented in the position location system illustrated in FIG. 4 according to one aspect of the disclosure.

FIG. 5 is a block diagram illustrating a position location initialization method 500 implemented in the indoor position location system of FIG. 4. At block 510, the method begins by determining whether an asset tag is awake by detecting an asset tag wakeup. For example, as shown in FIG. 4, the asset tags 402 periodically wake up as part of a synchronization process. At block 512, the asset tag searches for a narrowband pilot signal. For example, the APs 403 periodically transmit a narrowband pilot signal for detection by the asset tags 402. At block 514, it is determined whether the asset tag detects the narrowband pilot signal. Once detected, the asset tag synchronizes with the access point that transmitted the narrowband pilot signal at block 516. In one configuration, the narrowband pilot signal includes a known preamble or a pseudo noise (PN) code as an access point identification field. In this configuration, APs 403 send out the narrowband pilot signals to identify themselves. The APs 403 may not know which tag 406 is listening. Because there may be multiple of asset tags 402, an asset tag identification field (ID) may be included in the preamble of the narrowband pilot signal.

Figure 6:
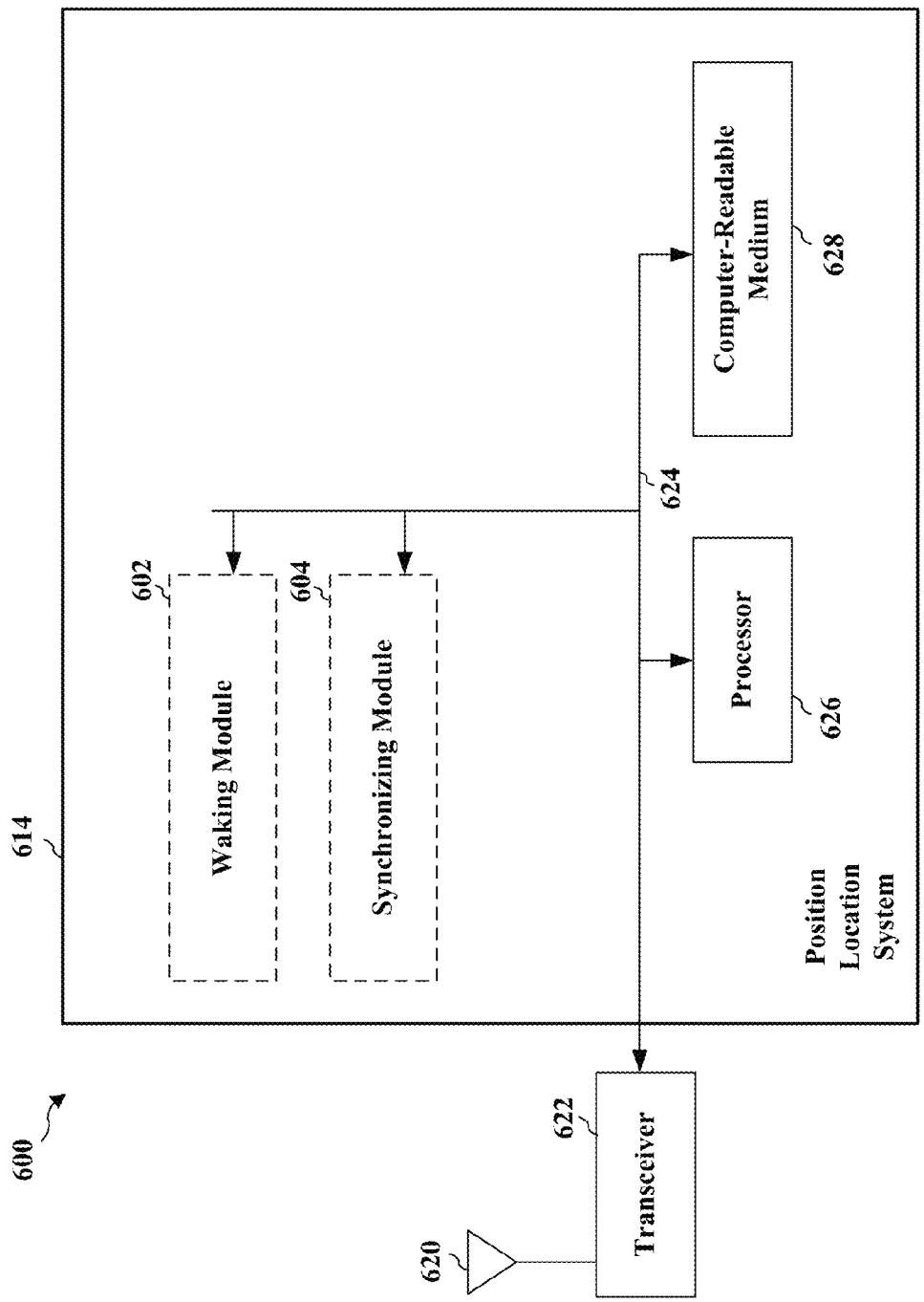
FIG. 6 is a diagram illustrating an example of a hardware implementation for an apparatus employing a position location system.

FIG. 6 is a diagram illustrating an example of a hardware implementation for an apparatus 600 employing a position location system 614. The position location system 614 may be implemented with a bus architecture, represented generally by a bus 624. The bus 624 may include any number of interconnecting buses and bridges depending on the specific application of the position location system 614 and the overall design constraints. The bus 624 links together various circuits including one or more processors and/or hardware modules, represented by a processor 626, a waking module 602, a synchronizing module 604 and a computer-readable medium 628. The bus 624 may also link various other circuits such as timing sources, peripherals, voltage regulators, and power management circuits, which are well known in the art, and therefore, will not be described any further.

The apparatus includes the position location system 614 coupled to a transceiver 622. The transceiver 622 is coupled to one or more antennas 620. The transceiver 622 provides a way for communicating with various other apparatus over a transmission medium. In one configuration, the transceiver 622 is configured as a narrowband messaging link (NML) such as the NML 220 shown in FIG. 2. Alternatively, the position location system 614 may include a separate narrowband messaging link, with the transceiver 622 configured as a wideband raging link. The position location system 614 includes the processor 626 coupled to the computer-readable medium 628. The processor 626 is responsible for general processing, including the execution of software stored on the computer-readable medium 628. The software, when executed by the processor 626, causes the position location system 614 to perform the various functions described supra for any particular apparatus. The computer-readable medium 628 may also be used for storing data that is manipulated by the processor 626 when executing software.

The position location system 614 includes a waking module 602 for periodically waking-up an asset tag to search for a narrowband pilot signal. The position location system 614 further includes a synchronizing module 604 for synchronizing the asset tag with an access point that transmitted the detected narrowband pilot signal. The waking module 602 and the synchronizing module 604 may be software modules running in the processor 626, resident/stored in the computer-readable medium 628, one or more hardware modules coupled to the processor 626, or some combination thereof. The position location system 614 may be a component of the wireless station 250, a component of the peer nodes 302 and/or a component of the access point 210, and may include the memory 242, 272 and/or the controller/processor 240, 270.

In one configuration, the apparatus 600 for wireless communication includes means for periodically waking an asset tag to search for a narrowband pilot signal and means for the asset tag with an access point that transmitted the detected narrowband pilot signal. The waking means may be the waking module 602, the wireless station 250, the memory 272, the controller/processor 270, and/or the position location system 614 of the apparatus 600 configured to perform the functions recited by the waking means. The synchronizing means may be the synchronizing module 604, the position location module 290/292, the wireless station 250, the memory 272, the controller/processor 270, the NML 220, the transceivers 254, the receive processor 258, and/or the position location system 614 of the apparatus 600 configured to perform the functions recited by the synchronizing means. In another aspect, the aforementioned means may be any module or any apparatus configured to perform the functions recited by the aforementioned means.

Figure 7:
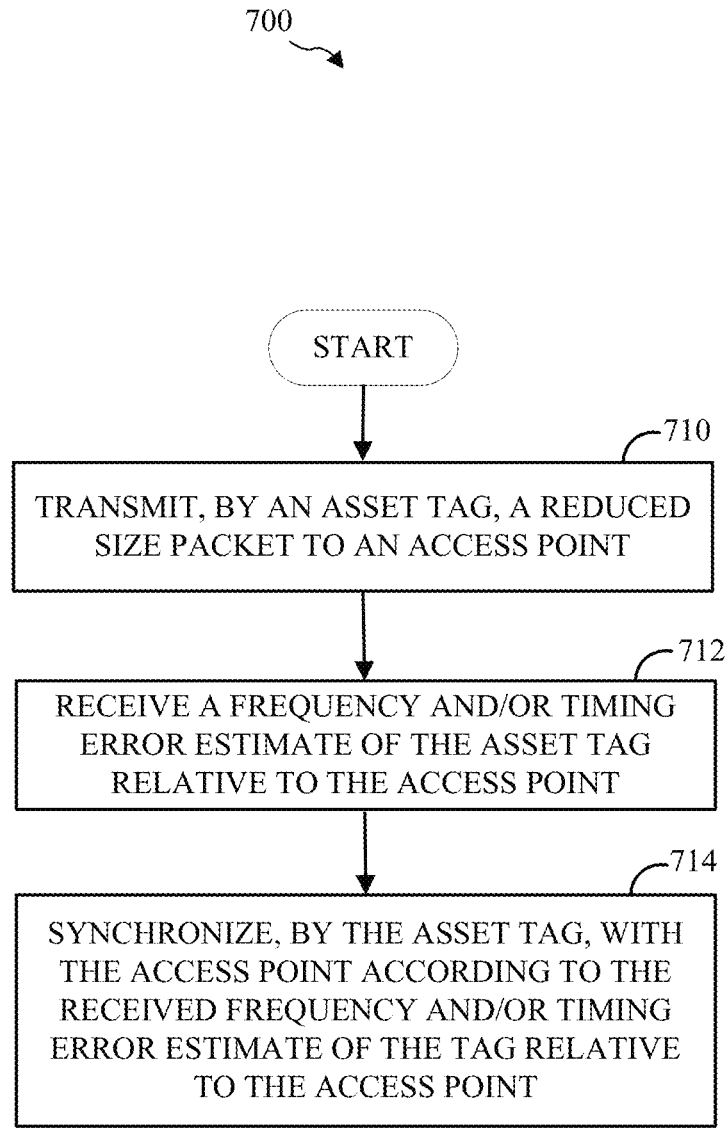
FIG. 7 is a block diagram illustrating a position location method implemented in the communication system illustrated in FIG. 4 according to one aspect of the disclosure.

FIG. 7 is a block diagrams illustrating a position location synchronization method 700 implemented in the indoor position location system of FIG. 4. At block 710, an asset tag transmits a reduced size packet to an access point. For example, as shown in FIG. 4, the asset tags 402 transmit a reduced size packet to the APs 403 using a narrowband message link (e.g., the NML 220). At block 712, the asset tag receives a frequency and/or timing error estimate of the asset tag relative to the access point. At block 714, the asset tag synchronizes with the access point according to the received frequency and/or timing error estimate of the asset tag relative to the access point. Once synchronized, a ranging operation with the access point may be initiated. For example, as shown in FIG. 4, the ranging operation may be performed by the APs 403 and/or the position location server 480 to determine a location of one of the asset tags 402-1.

Figure 8:
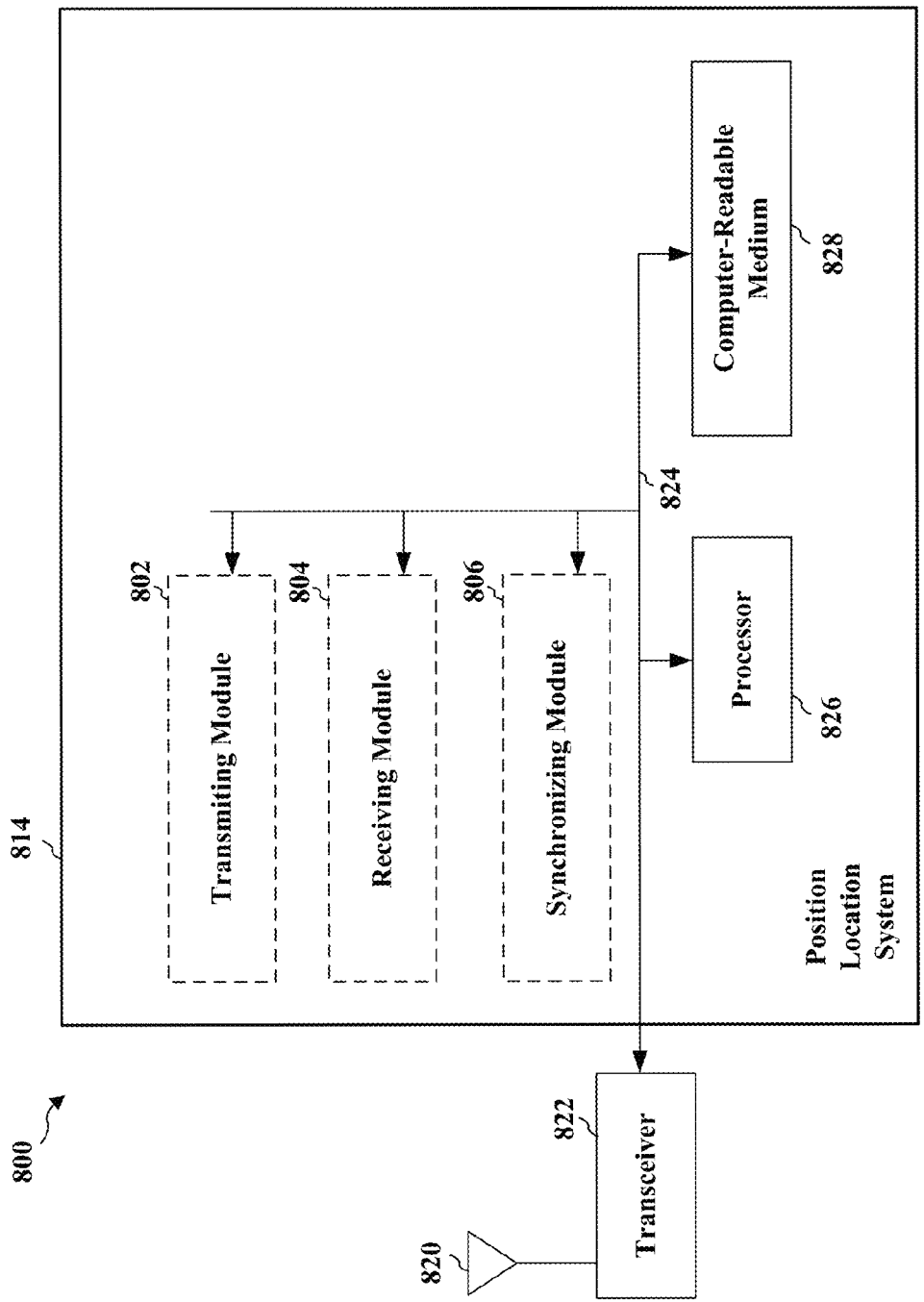
FIG. 8 is a diagram illustrating an example of a hardware implementation for an apparatus employing a position location system.

FIG. 8 is a diagram illustrating an example of a hardware implementation for an apparatus 800 employing a position location system 814. The position location system 814 may be implemented with a bus architecture, represented generally by a bus 824. The bus 824 may include any number of interconnecting buses and bridges depending on the specific application of the position location system 814 and the overall design constraints. The bus 824 links together various circuits including one or more processors and/or hardware modules, represented by a processor 826, a transmitting module 802, a receiving module 804, a synchronizing module 806 and a computer-readable medium 828. The bus 824 may also link various other circuits such as timing sources, peripherals, voltage regulators, and power management circuits, which are well known in the art, and therefore, will not be described any further.

The apparatus includes the position location system 814 coupled to a transceiver 822. The transceiver 822 is coupled to one or more antennas 820. The transceiver 822 provides a way for communicating with various other apparatus over a transmission medium. In one configuration, the transceiver 822 is configured as a narrowband messaging link (NML) such as the NML 220 shown in FIG. 2. Alternatively, the position location system 814 may include a separate narrowband messaging link, with the transceiver 822 configured as a wideband raging link. The position location system 814 includes the processor 826 coupled to the computer-readable medium 828. The processor 826 is responsible for general processing, including the execution of software stored on the computer-readable medium 828. The software, when executed by the processor 826, causes the position location system 814 to perform the various functions described supra for any particular apparatus. The computer-readable medium 828 may also be used for storing data that is manipulated by the processor 826 when executing software.

The position location system 814 further includes a transmitting module 802 for transmitting, by an asset tag, a reduced size packet to an access point. The position location system 814 also includes a receiving module 804 for receiving a frequency and/or timing error estimate of the asset tag relative to the access point. The position location system 814 further includes a synchronizing module 806 for synchronizing, by the asset tag, with the access point according to the received frequency and/or timing error estimate of the tag relative to the access point. The transmitting module 802, the receiving module 804, and the synchronizing module 806 may be software modules running in the processor 826, resident/stored in the computer-readable medium 828, one or more hardware modules coupled to the processor 826, or some combination thereof. The position location system 814 may be a component of the wireless station 250, a component of the peer nodes 302 and/or a component of the access point 210 and may include the memory 242, 272 and/or the controller/processor 240, 270.

In one configuration, the apparatus 800 for wireless communication includes means for transmitting, by an asset tag, a reduced size packet to an access point and means for receiving a frequency and/or timing error estimate of the asset tag relative to the access point. The transmitting means may be the transmitting module 802, the wireless station 250, the peer nodes 302, the memory 272, the controller/processor 270, the transceivers 254, the transmit processor 264, and/or the position location system 814 of the apparatus 800 configured to perform the functions recited by the transmitting means. The receiving means may be the receiving module 804, the wireless station 250, the peer nodes 302, the memory 272, the controller/processor 270, the transceivers 254, the receive processor 258, and/or the position location system 814 of the apparatus 800 configured to perform the functions recited by the receiving means. In another aspect, the aforementioned means may be any module or any apparatus configured to perform the functions recited by the aforementioned means.

The apparatus 800 for wireless communication may also include means for synchronizing, by the asset tag, with the access point according to the received frequency and/or timing error estimate of the tag relative to the access point. The synchronizing means may be the synchronizing module 806, the position location module 290/292, the wireless station 250, the peer nodes 302, the memory 272, the controller/processor 270, the NML 220, the transceivers 254, the receive processor 258, and/or the position location system 814 of the apparatus 800 configured to perform the functions recited by the synchronizing means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An indoor position location system, comprising:
 a two-way narrowband messaging link transceiver operable to enable synchronization and ranging initialization between asset tags and access points of the indoor position location system; and
 a two-way wideband ranging link transceiver operable to enable a ranging operation between the asset tags, the access points and a position location server of the indoor position location system, the position location server operable to determine a location of at least one of the asset tags according to the ranging operation.

2. The indoor position location system of claim 1, in which the two-way narrowband messaging link transceiver is further operable to periodically broadcast a narrowband pilot signal to the asset tags.

3. The indoor position location system of claim 2, in which the narrowband pilot signal comprises a known preamble and an access point identification field.

4. The indoor position location system of claim 2, in which the narrowband pilot signal comprises a pseudo noise (PN) code to identify one of the access points.

5. The indoor position location system of claim 1, in which the two-way narrowband messaging link transceiver is further operable to receive a reduced size packet from the at least one of the asset tags, and in which the two-way narrowband messaging link transceiver is further operable to transmit a frequency and/or timing error estimate of the at least one of the asset tags relative to one of the access points after a predetermined delay.

6. The indoor position location system of claim 1, in which the two-way narrowband messaging link transceiver is further operable to communicate scheduling information to the asset tags, the scheduling information indicating when the two-way wideband ranging link transceiver transmits a wideband ranging preamble and a pseudo noise (PN) sequence of the wideband ranging preamble to initiate the ranging operation.

7. The indoor position location system of claim 1, in which at least one of the asset tags is configured:
to periodically wake up to search for a narrowband pilot signal; and
to synchronize with at least one of the access points when the narrowband pilot signal is detected.

8. The indoor position location system of claim 7, in which the narrowband pilot signal comprises a known preamble as an asset tag identification field.

9. The indoor position location system of claim 7, in which the narrowband pilot signal comprises a pseudo noise (PN) code to identify the at least one asset tag.

10. The indoor position location system of claim 1, further comprising:
a memory; and
at least one processor coupled to the memory and configured:
to periodically wake-up to search for a narrowband pilot signal; and
to synchronize with at least one of the access points when the narrowband pilot signal is detected.

11. The indoor position location system of claim 10, in which the narrowband pilot signal comprises a known preamble as an access point identification field or a pseudo noise (PN) code to identify the access point.

12. A computer program product configured for the indoor position location system of claim 1, the computer program product comprising:
a non-transitory computer-readable medium having non-transitory program code recorded thereon, the non-transitory program code comprising:
program code to periodically wake-up to search for a narrowband pilot signal; and
program code to synchronize with at least one of the access points when the narrowband pilot signal is detected.

13. The indoor position location system of claim 1, further comprising:
means for periodically waking-up to search for a narrowband pilot signal; and
means for synchronizing with at least one of the access points when the narrowband pilot signal is detected.

14. A method within an indoor position location system, comprising:
transmitting, by an asset tag, a reduced size packet to an access point over a narrowband messaging link;
receiving, by the asset, a frequency and/or timing error estimate of the asset tag relative to the access point over the narrowband messaging link;
synchronizing, by the asset tag, with the access point according to the frequency and/or timing error estimate of the asset tag relative to the access point; and
initiating, by the asset, a ranging operation with the access point in response to receiving a wideband ranging signal received over a wideband ranging link.

15. The method of claim 14, further comprising:
waking the asset tag according to received scheduling information regarding a wideband ranging preamble; and
performing the ranging operation when a pseudo noise (PN) sequence of the wideband ranging preamble is detected.

16. An asset tag of an indoor position location system, comprising:
a memory; and
at least one processor coupled to the memory and configured:
to transmit a reduced size packet to an access point over a narrowband messaging link transceiver;
to receive a frequency and/or timing error estimate of the asset tag relative to the access point over the narrowband messaging link transceiver;
to synchronize with the access point according to the frequency and/or timing error estimate of the asset tag relative to the access point; and
initiate a ranging operation with the access point in response to a wideband ranging signal received over a wideband ranging link transceiver.

17. The asset tag of claim 16, in which the at least one processor is further configured:
to wake according to received scheduling information regarding a wideband ranging preamble; and
to performing a ranging operation when a pseudo noise (PN) sequence of the wideband ranging preamble is detected from the access point.

18. A computer program product configured for an asset tag of an indoor position location system, the computer program product comprising:
a non-transitory computer-readable medium having non-transitory program code recorded thereon, the non-transitory program code comprising:
program code to transmit a reduced size packet to an access point over a narrowband messaging link;
program code to receive a frequency and/or timing error estimate relative to the access point over the narrowband messaging link;
program code to synchronize with the access point according to the frequency and/or timing error estimate relative to the access point; and
program code to initiate a ranging operation with the access point in response to a wideband ranging signal received over a wideband ranging link.

19. An asset tag of an indoor position location system, comprising:
means for transmitting a reduced size packet to an access point over a narrowband messaging link;
means for receiving a frequency and/or timing error estimate of the asset tag relative to the access point over the narrowband messaging link;

means for synchronizing with the access point according to the frequency and/or timing error estimate of the asset tag relative to the access point; and means for initiating a ranging operation with the access point in response to a wideband ranging signal received over a wideband ranging link.

\* \* \* \* \*